S. PEATFIELD.
Nut-Locks.
No. 144,131.          Patented Oct. 28, 1873.
Fig. 1.          Fig. 2.
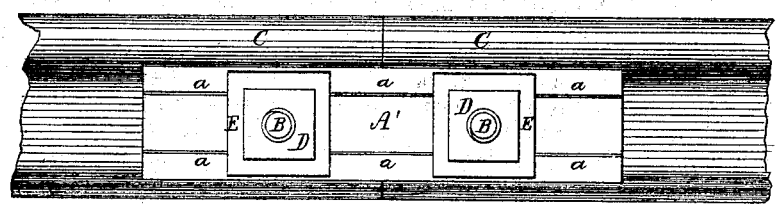 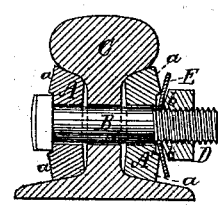
Fig. 4.          Fig. 3.
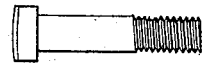 
Witnesses         Sanford Peatfield,
                     by his attorney

UNITED STATES PATENT OFFICE.

SANFORD PEATFIELD, OF IPSWICH, MASSACHUSETTS.

IMPROVEMENT IN NUT-LOCKS.

Specification forming part of Letters Patent No. 144,131, dated October 28, 1873; application filed August 20, 1873.

*To all whom it may concern:*

Be it known that I, SANFORD PEATFIELD, of Ipswich, of the county of Essex and State of Massachusetts, have invented a new and useful Improvement in Railway-Rail Connections; and I do hereby declare the same to be fully described in the following specification and represented in the accompanying drawings, of which—

Figure 1 denotes a side elevation, and Fig. 2 a transverse section, of portions of a railway-rail and the metallic bars, screw-nut, and washer used in connecting it to another rail. Fig. 3 is an end view of the nut, and Fig. 4 a side view of the bolt, my improvement being exhibited in such figures.

The object of the invention is to hold the nut on the screw or keep such nut from accidentally working loose thereon.

In carrying out my invention I form or make each of the connection-bars A A' concave transversely on its outer side and provided with parallel ribs or flanges $a$ $a$, running longitudinally of it at its edges. The screw-bolt B, which goes through the two bars and the rail C, is to have its head of a width to fit into the concavity of the bar next it, or abut at its edges against the ribs of the said bar, or the bolt-head may be beveled on its inner face in two opposite sides thereof, as the screw-nut is beveled. The said nut shown at D is beveled or chamfered on its inner surface from two opposite edges, in manner as shown at $b$ $b$. The washer E is to be of plate metal, and is to rest against the ribs or boundaries of the concavity of the next adjacent connection-bar. When the nut is screwed up sufficiently it will crowd and bend the washer into the concavity or space between the ribs, especially when the bevels of the nut are brought into parallelism with ribs. When the nut has once been set up, the bevels, the bent washer, and the concavity or the ribs of the connection-bar, by co-operating, will prevent any accidental working loosely of the nut on its screw liable to be caused by the jarring of the rails and the connections by a passing train of cars. It is of very great importance to prevent the nuts from accidentally working loose upon the screws of the bolts, and heretofore there have been various devices for such purposes. The means adopted by me and herein described I believe to be new, and they thoroughly accomplish the end desired.

What I claim as my invention or improvement is—

The nut provided with the opposite bevels $b$ $b$, in combination with the connection-bars A A' grooved longitudinally, and washer E, all being constructed, arranged, and applied together substantially in manner as shown and described.

SANFORD PEATFIELD.

Witnesses:
R. H. EDDY,
J. R. SNOW.